United States Patent
Burdette et al.

(10) Patent No.: US 10,278,029 B2
(45) Date of Patent: Apr. 30, 2019

(54) VEHICLE BASED COMMUNICATION OF LOCATION DATA BETWEEN EXTERNAL APPLICATIONS AND DEVICES

(71) Applicant: FORD GLOBAL TECHNOLOGIES, LLC, Dearborn, MI (US)

(72) Inventors: Kevin Burdette, Plymouth, MI (US); Jeffrey Yizhou Hu, Ann Arbor, MI (US); Robin Mathew Kurian, Farmington Hills, MI (US); Kujtim Shala, Cologne NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/711,798

(22) Filed: Sep. 21, 2017

(65) Prior Publication Data
US 2019/0090097 A1    Mar. 21, 2019

(51) Int. Cl.
*H04W 4/80* (2018.01)
*H04W 4/04* (2009.01)
*H04M 1/60* (2006.01)

(52) U.S. Cl.
CPC ........... *H04W 4/04* (2013.01); *H04M 1/6075* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,769,023 B2 | 7/2014 | Lau | |
| 9,141,583 B2* | 9/2015 | Prakah-Asante | B60K 28/02 |
| 9,554,241 B2* | 1/2017 | Foster | G01S 5/0263 |
| 2009/0079622 A1 | 3/2009 | Seshadri et al. | |
| 2011/0219105 A1* | 9/2011 | Kryze | G06F 15/16 709/223 |
| 2016/0352886 A1* | 12/2016 | Dickow | H04M 1/72527 |
| 2017/0019763 A1 | 1/2017 | Chi et al. | |
| 2018/0032997 A1* | 2/2018 | Gordon | G06Q 20/3224 |

\* cited by examiner

*Primary Examiner* — Fayyaz Alam
(74) *Attorney, Agent, or Firm* — Brooks Kushman P.C.

(57) ABSTRACT

A vehicle and method of operation, which include a vehicle computing system having at least one controller coupled to a transceiver and configured to poll for and respond to subscribe requests from at least two mobile device applications, communicating with the transceiver near a vehicle cabin. In response to the subscribe requests, the controller(s) establish a monitored connection to an active one of the navigation applications. In response to at least one of destination, waypoint, active status, and current location signals from the monitored connection, the controller(s) communicate the signals to inactive applications, and may be further configured to communicate such signals from the inactive applications to other active and inactive applications. The controller(s) also poll the navigation and/or non-navigation applications for one or more data share permissions and messaging capabilities, and establish data push connections to the inactive applications according to the data share permissions and messaging capabilities.

17 Claims, 2 Drawing Sheets

VEHICLE BASED COMMUNICATION OF LOCATION DATA BETWEEN EXTERNAL APPLICATIONS AND DEVICES

TECHNICAL FIELD

The disclosure relates to vehicle computing systems configured to share location data between mobile navigation and non-navigation devices and applications that are configured to communicate with the vehicle computing systems.

BACKGROUND

Vehicle manufacturers have developed various types of in-vehicle and/or on-board computer processing systems that include vehicle control, navigation, entertainment, and various other vehicle related applications. Additionally, such systems sometimes are further enabled to connect with remote and near-by third party, external, and/or off-board devices, applications, networks, and systems. Such external, third-party, off-board devices and systems can include, for purposes of example, media players, mobile navigation devices, cellular, mobile, and satellite phones, personal digital assistants (PDAs), and many other devices and related applications. Such connection capabilities have established a need for new and improved capabilities that enable control and exchange of data between the on-board vehicle computer processing systems and such external, off-board devices and applications.

SUMMARY

Many types of personal, commercial, and industrial vehicles, including combustion engine and hybrid, plug-in hybrid, and battery electric vehicles. hereafter collectively referred to as "vehicles," include several types of in-vehicle computing systems, interfaces, networks, communications capabilities, and applications, which enable vehicle operation, as well as on-board and in-vehicle navigation, entertainment, and related communications capabilities, and control and exchange of data between many types of external and off-board devices and systems.

The disclosure is directed to a vehicle that includes at least one and/or one or more controller(s) coupled to a transceiver, which is configured to respond to subscribe requests from at least two mobile device navigation applications and/or non-navigation applications that are in communication with the transceiver. The controller(s) are further configured in response, to establish a monitored connection to an active one of the navigation applications. Additionally, in response to at least one of destination and waypoint signals from the monitored connection, the controller(s) are also configured to communicate the signals to inactive navigation and/or non-navigation applications and/or devices.

The vehicle and included controller(s) are further configured to respond to one or more of: the destination and waypoint signals, an active status signal, and a current location signal from one of the navigation and/or non-navigation applications. In response, the controller(s) are also configured to utilize the transceiver to poll each of the navigation and/or non-navigation applications for one or more of respective data share permissions and messaging capabilities. According to the data share permissions and messaging capabilities, received from each navigation and/or non-navigation application in response to the polling, the controller(s) are further modified to establish data push connections to the inactive navigation and/or non-navigation applications.

The disclosure is directed to other variations of the vehicle and incorporated controller configured to respond to the destination and waypoint signals, and to designate as active, the navigation application that generated a most recent of the signals, and as inactive, the remaining navigation and/or non-navigation applications. In other modifications, the disclosure contemplates the vehicle and included controller also being coupled to a vehicle display system, and further configured to respond to the signals by polling each of the navigation and/or non-navigation applications for one or more of respective active status priority, data share permissions, and messaging capabilities.

According to the responses received to the polling, the controller(s) are also enabled to establish data push connections to the inactive navigation and/or non-navigation applications. Further, the controller(s) are modified to communicate to the display, at least one of active status priority, data share permissions, messaging capabilities, and unavailability designators identifying one or more of denied permissions and unavailable messaging capabilities.

Also included in the disclosure are the vehicle and controller being further configured to, in response to one or more of the destination and waypoint signals from an inactive one of the navigation and/or non-navigation applications, to poll the inactive navigation application that sent the signal(s) for an active status signal. In response to a reply active status signal from the previously inactive navigation application, the controller(s) are also configured to reassign the monitored connection to the newly active one of the navigation applications that sent the signal(s), and to designate as inactive the remaining navigation and/or non-navigation applications. In further variations to the disclosure, the controller(s) are also configured to communicate a current location to the active and inactive navigation and/or non-navigation applications, in response to the current location signal, and/or other signals.

The disclosure is further directed to the vehicle and controller(s) configured to detect mobile devices and/or included applications proximate a vehicle cabin, and to push subscribe requests to at least one of and one or more of the mobile devices and navigation and/or non-navigation applications. In response to a subscribe reply from one or more and/or at least one of the mobile devices and applications, establish a monitored connection to an active one of the navigation applications. Further, the controller(s) in this variation are also responsive to at least one of destination and waypoint signals from the monitored connection, and to communicate the signals to inactive navigation and/or non-navigation applications.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
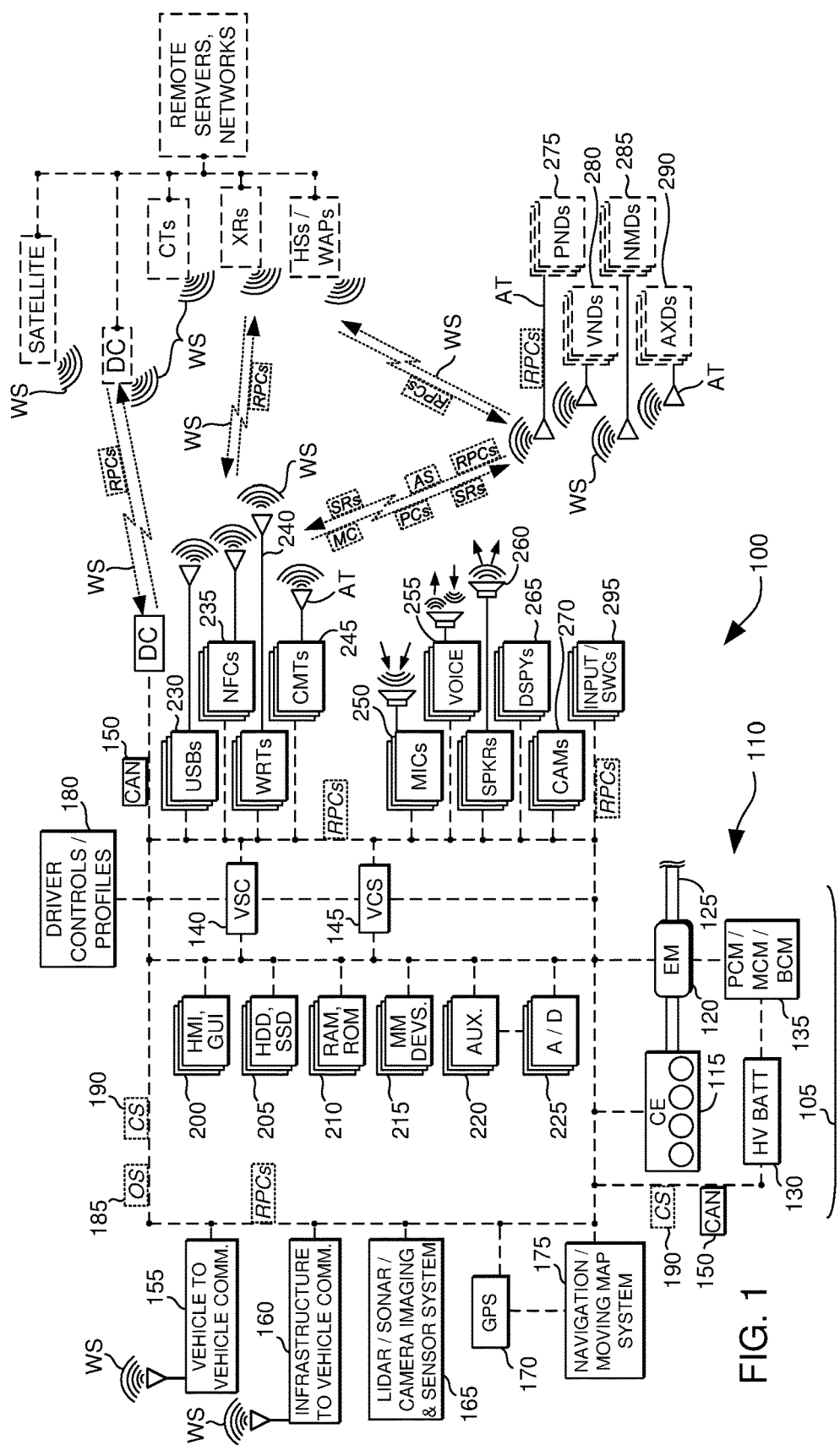
FIG. 1 is an illustration of a vehicle and its systems, controllers, components, sensors, actuators, and methods of operation.
Figure 2:
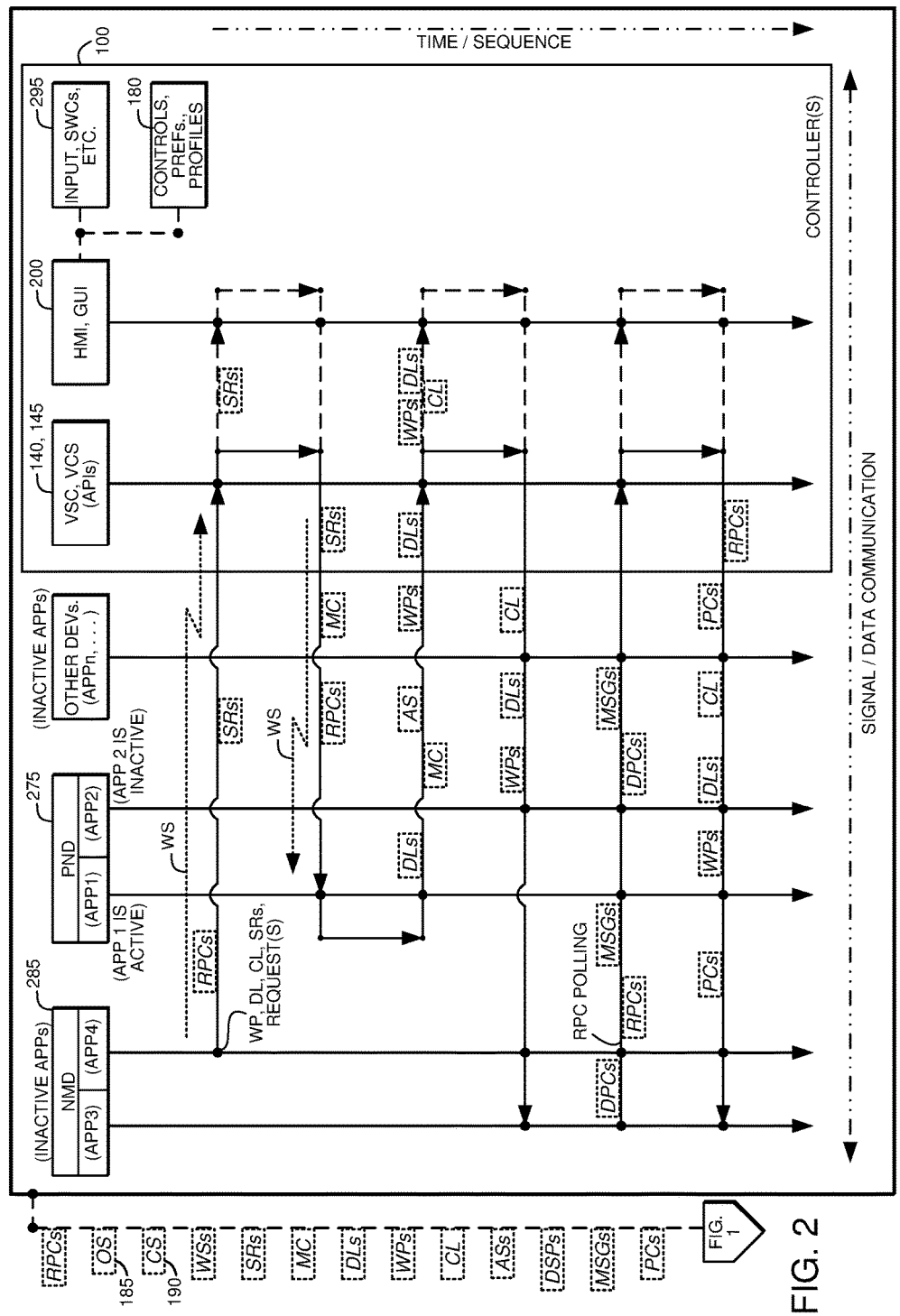
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130, 135. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and that may be incorporated as part of a vehicle system controller (VSC) 140 and a vehicle computing system (VCS) and controller 145, which are in communication with PCM/MCM/BCM 135, other controllers. For example, in some configurations for purposes of example but not limitation, VSC 140 and/or VCS 145 is and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein. Such contemplated components and systems are available from various sources, and are for purposes of example manufactured by and/or available from the SmartDeviceLink Consortium, the OpenXC project, the Ford Motor Company, and others (See, for example, openXCplatform.com, SmartDeviceLink.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC™ AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing the in-vehicle or on-board HMIs, such as GUI 200 and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUI 200, and also may include utilization of on-board or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100. CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), wide area networks (WANs), among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged communications, navigation, and other systems, controllers, and/or sensors, such as a vehicle to vehicle communications system (V2V) 155, and roadway infrastructure to vehicle communication system (I2V) 160, a LIDAR/SONAR (light and/or sound detection and ranging) and/or video camera roadway proximity imaging and obstacle sensor system 165, a GPS or global positioning system 170, and a navigation and moving map display and sensor system 175, among others. VCS 145 can cooperate in parallel, in series, and distributively with VSC 140 and such steering wheel controls and buttons h other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data. Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, and/or various others. For example, the controllers may establish bidirectional communications with such internal and external sources, and communicate control commands, logic, and instructions and code, data, information, and signals to and/or from engine 115, EM 120, batteries 130, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 185, and control or command signals (CS) 190 received from and sent to and between controllers and vehicle components and systems, either over wired and/or wireless data and signaling connections. OS 185, and CS 190, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIGS. 1 and 2, and by flow charts or similar diagrams as exemplified in the methods of the disclosure illustrated specifically in FIG. 2. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. For example, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100. Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components.

For additional examples, VCS 145, GUIs 200, and other controllers of vehicle 100, may include, incorporate, be paired to, synchronized with, and/or be coupled with vehicle-based multimedia devices 215, auxiliary input(s)

220 and analog/digital (A/D) circuits 225, universal serial bus port(s) (USBs) 230, near field communication transceivers (NFCs) 235 such as "Bluetooth" devices, wireless routers and/or transceivers (WRTs) 240 that enable wireless personal and local area networks (WPANs, WLANs) or "WiFi" IEEE 802.11 and 803.11 communications standards (Institute of Electrical and Electronics Engineers), and/or analog and digital cellular network modems and transceivers (CMTs) 245 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

These contemplated onboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, personal navigation devices (PNDs) 275, portable vehicle navigation devices (VNDs) 280, nomadic and mobile devices (NMDs) 285, and/or other portable auxiliary devices (AXDs) 290, among others, which each include at least one and/or one or more integrated signaling and communications antennas and/or transceivers (AT).

Such input and output devices are and/or may be selectable, connectable, synchronized with, paired to, and/or actuatable with an input selector 295. Input selector 295 may include, incorporate, and/or be integrated with and/or as part of GUI 200 and the contemplated hardware and software SWCs, controls, buttons, and/or switches (also 295) contemplated by the disclosure as being part of and utilized with the steering wheel and related components, and with the vehicle dashboard and instrument panels and clusters. Such input selector, SWCs, controls, buttons, and/or switches may be hardware or software or combinations thereof and may be configurable utilizing one or more predetermined, default, and adjustable factory and/or driver controls, profiles, and/or preferences 180.

The contemplated microphones 250, voice processing and recognition devices and subsystems 255, speaker(s) 260, additional display(s) 265, camera(s) 270, PNDs 275, VNDs 280, NMDs 285, and/or other portable auxiliary devices AXDs 290, may include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS and navigation devices, and similar devices and components that each may include integrated transceivers and antennas AT, wired and plugged connectors DC, and related components, for wired and wireless multimedia and data communications WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WS, with external near and far nomadic, portable, and/or mobile devices, 275, 280, 285, 295, networks, and systems that may include, for example, hotspots and wireless access points (HS/WAPs), nano and micro and regular cellular access points and towers (CT), external routers (XRs), and related and accessible external, remote networks, systems, and servers.

With continuing reference to the various figures, including FIGS. 1 and 2, it may be understood by those with knowledge in the relevant fields of technology that the disclosure contemplates vehicle 100 to include at least one and/or one or more controller(s) such as VSC 140, VCS 145, and others coupled with an in-vehicle or on-board transceiver AT, such as those described in connection with USBs 230, NFCs 235, WRTs 240, and/or CMTs 245. The controller(s) 140, 145 and transceiver(s) AT are configured to detect and connect with WSs to nearby or proximate or far but in-range of WSs, third-party, off-board, external devices such as nomadic, portable, and/or mobile devices, 275, 280, 285, 295.

Such controller(s) 140, 145 are further configured to initiate such connections automatically, and also in response to subscribe requests (SRs) from at least one or two or more of such navigation and/or non-navigation devices and/or applications (APPs), including for example one of the mobile devices, such as for example PND 275, which incorporates one or more and/or at least two navigation and/or non-navigation APPs such as APP 1, APP 2, and others (FIG. 2). In FIG. 2, the solid data communication lines and solid dots at intersections indicate date transfer or exchange or communication, while the solid half-circles indicate no data exchange/communication.

In this arrangement of the disclosure, in an additional example for illustration purposes but not limitation, at least one of the APPS such as APP 1 is a navigation application and is configured to have an active state of operation whereby APP 1 is identified, selected, operated, and/or designated to be a primary navigation application, which thereby enables control and/or priority of navigation operation for vehicle 100. In one configuration, a single one of the navigation APPs, here APP 1, is configured to be active at a time, such that all other navigation and/or non-navigation APPs, including the embedded GPS 170 and navigation system 175 of vehicle 100, are identified, designated, selected, and/or operated in an inactive state of operation. Non-navigation APPs are typically never designated as active, but can send and receive waypoints and destinations to the active navigation APPs. While such non-navigation applications and inactive navigation applications may be utilized by a driver or user of the vehicle 100, while subscribed, such non-navigations are cannot be designated as active because they cannot enable navigation functions that enable route planning and related capabilities to new destinations and waypoints.

During the active state, navigation APPs are configured to enable selection, designation, modification, and/or management of destination locations (DLs) and waypoints (WPs), and/or signals that represent and/or include such DLs and WPs, between such destinations and a current location (CL) and/or CL signal of vehicle 100. Such active navigation APPs are also configured to receive new waypoints and/or destinations from other inactive navigation and/or non-navigation applications, which may include for example without limitation, non-navigation applications that generate and communicate suggested fueling stations, restaurants, and other waypoints and destinations of interest that may be identified, suggested, recommended, and/or selected by such applications and users thereof. The CL of vehicle 100 may be determined concurrently by the active APP, as well as by the inactive APPs and devices, and GPS 170 and navigation system 175. However, the active APP or navigation application has priority of the other APPs and pushes new and modified waypoints and destinations to the other inactive APPs.

In further variations of the disclosure, VSC 140 and VCS 145 controller(s) via devices such as NFC 235 and respective, integrated antenna and transceiver AT, are configured to respond to unsolicited SRs from nomadic, mobile devices 275, 280, 285, 290, as well as to subscribe replies to SRs pushed thereto by controller(s) 140, 145, and/or by other devices and components of vehicle 100. Such SRs are communicated and/or transmitted and received via WSs and may be part of, in response to, incorporated with other commands, data, and/or signals that may also include, for purposes of further example remote procedure calls (RPCs). Such RPC embedded SRs may be enabled by the contemplated APIs and other capabilities of vehicle 100 and the nomadic, mobile, and related devices 275, 280, 285, 290 among other components, subsystems, and systems.

In further modifications of the disclosure and vehicle 100, such controllers are also configured to establish a monitored connection (MC) between the active one of the navigation APPs, such as APP 1, and the controllers 140, 145, and the APIs and components and/or devices 230, 235, 240, 245. The MC also enables the controller(s), such as VSC 140, VCS 145, and others, to periodically and/or continuously monitor the active APP, such as APP 1, and to receive the DLs, WPs, and/or CL, and in response to communicate such new, existing, modified, and/or deleted WPs, DLs, and/or CL from the active APP (here "APP" 1 in the instant example), to the other inactive navigation and/or non-navigation APPs, as well as to GUI, HMI 200, and other APPs, devices, components, subsystems, and systems internal and external to vehicle 100.

The disclosure is also directed to the controller(s), such as VSC 140, VCS 145, and others, being configured to respond an active status (AS) and/or AS signal from at least one of the APPs of the nomadic, mobile devices 275, 280, 285, 290, in addition to the other DL, WP, CL signals, and to communicate with and via RPCs poll each, at least one, and/or one or more of such APPs, for respective data share permissions (DSPs) and messaging capabilities (MSGs). Such DSPs enable each of such APPs to have predetermined, selectable, default, and or adjustable permissions that can control what information may be shared with vehicle 100 and its controllers, as well as with other APPs. Additionally, one or more default DSPs may be stored in and received from driver controls, preferences, and profiles 180 in the absence of DSPs received from the APPs.

In other variations, DSPs may be received, adjusted, confirmed, and/or acknowledged via GUI, HMI 200. MSGs are configured to identify what if any messaging capabilities each respective APP and/or device may have available for purposes of communicating with the controllers of vehicle 100. In the absence of receiving DSPs and MSGs in response to RPC polling, the controllers may generate an error message and/or alert that can be stored in repository 180, communicated to the application or device that generated the RPC, and/or communicated and annunciated to GUI, HMI 200, as illustrated generally by dashed lines of FIG. 2.

The controllers in other modifications are configured to establish one or more and/or at least one data push connection(s) (PCs) to the inactive navigation and/or non-navigation APPs, according to the respective DSPs and MSGs, which PCs are configured to push only such data as is available according to MSG capabilities of the respective active and inactive APPs, and permitted by the DSPs of each respective active and inactive APP. In other modifications of the disclosure, active status of the APPs may be changed according to new and/or most recent AS and other signals received from a previously inactive one of the APPs. In response and upon receipt by the controllers, the remaining APPs may be designated to be inactive. The controllers may also be modified such that one or more of and/or at least one of GUI, HMI 200, and displays 265 may receive and display one or more of ASs, DSPs, MSGs, MCs, WPs, DLs, CL, and include highlights and/or annunciations for permitted, denied, available, and unavailable DSPs and MSGs.

Vehicle 100 and controllers such as VSC 140 and VCS 145 are also configured in other variations to periodically and/or upon demand to poll inactive ones of the APPs for a new AS, and in response to a reply AS, to reassign MC to the active one of the navigation APPs, and to designate as inactive the remaining navigation and/or non-navigation APPs. The controllers may also be configured to communicate such new and/or changed ASs, reassigned MCs, and/or newly designated inactive statuses to GUI, HMI 200 and/or displays 265, and other components of vehicle 100.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a controller coupled to a transceiver and configured to:
   in response to subscribe requests from at least two mobile device applications communicating with the transceiver,
      establish a monitored connection to an active one of the applications, and
      in response to at least one of destination and waypoint signals from the monitored connection, communicate the signals to inactive applications; and
   communicate a current location to one of the inactive applications.

2. The vehicle according to claim 1, comprising:
   the controller further configured to, in response to one or more of the destination and waypoint signals, an active status signal, and a current location signal from one of the applications that is a navigation application:
      by the transceiver, poll the applications for one or more of respective data share permissions and messaging capabilities; and
      establish data push connections to the inactive applications according to the respective data share permissions and messaging capabilities.

3. The vehicle according to claim 2, comprising:
   the controller further configured to, in response to the signals:
      designate:
         as active the navigation application that generated a most recent of the signals, and
         as inactive the other applications.

4. The vehicle according to claim 2, comprising:
   the controller coupled to a vehicle display system, and further configured to, in response to the signals:
      poll the navigation applications for one or more of respective active status signal, data share permissions, and messaging capabilities;
      establish data push connections to the inactive applications according to the respective active status signal, data share permissions and messaging capabilities; and
      communicate to the display, at least one of active status signal, data share permissions, messaging capabilities, and unavailability designators identifying one or more of denied permissions and unavailable messaging capabilities.

5. The vehicle according to claim 2, comprising:
   the controller further configured to, in response to one or more of the destination and waypoint signals from an inactive one of the applications:
      poll the inactive one of navigation applications for an active status signal;
      in response to a reply active status signal; and
      reassign the monitored connection to the active one of the navigation applications, and designate as inactive the other applications.

6. The vehicle according to claim 5, comprising:
   the controller further configured to:
      poll the applications for one or more of respective data share permissions and messaging capabilities; and
      establish data push connections to the inactive applications according to the respective data share permissions and messaging capabilities.

7. The vehicle according to claim 1, comprising:
   the controller further configured to, in response to one or more of the destination and waypoint signals, and an active status signal, from an inactive one of the applications that is a navigation application and that asserts active status by one of the signals:
      reassign the monitored connection to the active one of the navigation applications, and designate as inactive the other applications.

8. The vehicle according to claim 7, comprising:
   the controller coupled to a vehicle display system, and further configured to, in response to at least one of the signals including an active status assertion:
      communicate one or more of changed active and inactive statuses of the applications to the display.

9. The vehicle according to claim 1, comprising:
   the controller further configured to:
   communicate a current location to each of the applications.

10. A vehicle, comprising:
    a controller coupled to a transceiver and configured to:
    push subscribe requests to mobile device applications proximate a vehicle cabin,
       in response to a subscribe reply, establish a monitored connection to an active one of the applications that is a navigation application,
       in response to at least one of destination and waypoint signals from the monitored connection, communicate the signals to inactive applications, and
    in response to one or more of the destination and waypoint signals, and an active status signal, from an inactive one of the navigation applications that asserts active status by one of the signals, reassign the monitored connection to the active one of the navigation applications, and designate as inactive the other applications.

11. The vehicle according to claim 10, comprising:
    the controller further configured to, in response to one or more of the destination and waypoint signals, an active status signal, and a current location signal from one of the applications that is a navigation application:
       poll the applications for one or more of respective data share permissions and messaging capabilities; and
       establish data push connections to the inactive applications according to the respective data share permissions and messaging capabilities.

12. The vehicle according to claim 11, comprising:
    the controller further configured to, in response to the signals:
       designate:
          as active the navigation application that generated a most recent of the signals, and
          as inactive the other applications.

13. The vehicle according to claim 11, comprising:
    the controller further configured to:

poll the navigation applications for one or more of respective data share permissions and messaging capabilities; and establish data push connections to the inactive applications according to the respective data share permissions and messaging capabilities.

14. A method of controlling a vehicle, comprising:

by a controller, coupled to a transceiver:

in response to subscribe requests from at least two mobile device applications communicating with the transceiver, establishing a monitored connection to an active one of the applications that is a navigation application, and in response to at least one of destination and waypoint signals from the monitored connection, communicating the signals to inactive applications; and by the transceiver, in response to one or more of the destination and waypoint signals, an active status signal, and a current location signal from one of the navigation applications:

polling the applications for one or more of respective data share permissions and messaging capabilities, and establishing data push connections to the inactive applications according to the respective data share permissions and messaging capabilities.

15. The method according to claim 14, comprising:

the controller further configured to, in response to one or more of the destination and waypoint signals, and an active status signal, from an inactive one of the navigation applications that asserts active status by one of the signals:

reassign the monitored connection to the active one of the navigation applications, and designate as inactive the other applications.

16. The method according to claim 14, comprising:

by the controller, in response to the signals:

designating:

as active the navigation application that generated a most recent of the signals, and as inactive the other applications.

17. The method according to claim 14, comprising:

by the controller:

polling the navigation for one or more of respective data share permissions and messaging capabilities; and establishing data push connections to the inactive applications according to the respective data share permissions and messaging capabilities.

* * * * *